(12) United States Patent
Rice

(10) Patent No.: US 6,536,158 B2
(45) Date of Patent: Mar. 25, 2003

(54) ORNAMENTAL TREE PROTECTOR

(76) Inventor: George Rice, 19900 Saxton, Southfield, MI (US) 48075

( * ) Notice: Subject to any disclaimer, the term of this patent is extended or adjusted under 35 U.S.C. 154(b) by 0 days.

(21) Appl. No.: 09/880,640

(22) Filed: Jun. 14, 2001

(65) Prior Publication Data

US 2002/0189161 A1 Dec. 19, 2002

(51) Int. Cl.⁷ .................................................. A01G 13/02
(52) U.S. Cl. ........................................ 47/32.4; 47/32.6
(58) Field of Search ................................ 47/20.1, 32.4, 47/32.6, 33, 85, 40.5, 42; D8/1

(56) References Cited

U.S. PATENT DOCUMENTS

| | | | | |
|---|---|---|---|---|
| 44,238 A | * | 9/1864 | Towne | 43/108 |
| 1,579,534 A | * | 4/1926 | Hibbard et al. | 43/108 |
| 3,571,972 A | * | 3/1971 | Carter, Jr. | 47/30 |
| 3,590,401 A | * | 7/1971 | Brown | 4/236 |
| 4,308,688 A | | 1/1982 | Revane | 47/25 |
| D274,211 S | * | 6/1984 | Haggard | D25/156 |
| 4,502,244 A | | 3/1985 | Yoham | 47/25 |
| 4,648,203 A | * | 3/1987 | Worzek | 47/32 |
| 4,700,507 A | * | 10/1987 | Allen | 47/32.4 |
| D301,536 S | * | 6/1989 | Spear | D34/1 |
| 4,932,157 A | * | 6/1990 | Shimp | 47/32 |
| 5,085,001 A | | 2/1992 | Crawley | 47/25 |
| 5,337,909 A | * | 8/1994 | Vailliencourt | 215/12.1 |
| 5,452,541 A | * | 9/1995 | DeMaio | 404/7 |
| 5,577,343 A | * | 11/1996 | Flasch, Jr. | 47/33 |
| 5,581,935 A | * | 12/1996 | Anderson | 47/32 |
| 5,794,378 A | | 8/1998 | Beatrez | 47/25 |
| 5,850,709 A | * | 12/1998 | Mahoney | 47/1.01 R |
| 5,878,528 A | | 3/1999 | Pattyn | 47/25 |
| D408,231 S | * | 4/1999 | Bohn | D8/1 |
| D413,495 S | * | 9/1999 | Carter | D8/1 |
| 6,276,869 B1 | * | 8/2001 | Yakushinji | 256/1 |
| 6,349,500 B1 | * | 2/2002 | Popham | 2/222 |

* cited by examiner

Primary Examiner—Charles T. Jordan
Assistant Examiner—Bret Hayes
(74) Attorney, Agent, or Firm—Charles W. Chandler

(57) ABSTRACT

A decorative tree protector which is positioned on the ground around a tree trunk to prevent grass from growing close to the tree trunk. The tree protector includes a round hollow body having a top wall, downwardly dependent sidewall, and a radially extending lower rim for ease of mowing around. A central hole through the top wall and a radial slit from the central hole allow the tree protector to be fit around the trunk of a tree. Opposing portions of the protector body at the slit are retained together after fitting around the tree by retaining screws and nuts. The tree protector can include a built-in seat formed into the top wall and sidewall thereof, being coverable by a pivoting seat cover. The tree protector can further include a decorative device such as a flower trough, a plurality of battery-powered light bulbs extending from the sidewall, a decorative metallic band, or external decorations such as bark, mulch, stones, bricks, sand, or plants, affixed to the protector body. A plurality of adjustable legs connected to the protector body are individually extendable downwardly from the protector body to contact the ground and support the protector body in a level position on uneven ground.

4 Claims, 6 Drawing Sheets

ORNAMENTAL TREE PROTECTOR

BACKGROUND OF THE INVENTION

1. Field of Invention

The present invention relates to devices for protecting and preventing vegetation growth around trees, and more particularly to those devices, which are also decorative.

2. Description of Related Art

Inhibition of Vegetation

The growth of vegetation around trees is a long-standing problem, particularly on grass lawns around buildings. When the grass directly abuts the trunk of a tree, cutting with a lawn mower is difficult since the rotating blade is shielded by a horizontal shroud or blade cover to prevent unintentional contact of the blade with objects including a person's hands. The blade is typically two to three inches inside the cover such that when the blade cover contacts the tree, two to three inches of grass are left uncut. This remaining grass is unsightly and must be cut by hand using hand shears or pulled out. Both are very time consuming activities.

One way to solve the trimming problem is to prevent the growth of grass and other vegetation immediately around the trunk of the tree. This is commonly done by piling a material such as mulch, tree bark, or stones around the trunk. Any grass and other vegetation on the ground below the pile does not receive light and thus dies. Furthermore, such materials do not support plant growth well so plants tend not to grow on such material. Such materials are also decorative to add aesthetic appeal to the yard, but tend to get scattered onto the lawn.

In an effort to solve these problems, flexible skirts were developed which replace the piled material. One example is disclosed in U.S. Pat. No. 5,085,001 issued to Crawley. The mulch skirt is formed of a single sheet having a central hole with a radial slit extending to the outer edge of the sheet. A plurality of removable adjustment strips is formed in the sheet around the central hole by successive concentric rows of serrations. The mulch skirt can be custom-fit to the diameter of the tree trunk by removing one or more of the adjustment strips. The mulch skirt can be stabilized by an outer ring and anchor pin, which extend into the ground. The mulch skirt protects the trunk of the tree, but the piled material can still be scattered onto the ground.

Protection of Trees

The protection of tree trunks from damage such as from trimming with lawn mowers when the grass directly abuts the trunk of a tree is also a long-standing problem. In an effort to solve this problem, annular tree protectors made of flexible or semi-rigid materials were developed which are placed around the trunk of the tree. Examples of such tree protectors are disclosed in U.S. Pat. Nos. 4,502,244; 5,085, 001; 4,700,507, and 4,308,688.

A tree protector is disclosed in U.S. Pat. No. 5,878,528 issued to Pattyn which is designed to repel salt-containing snow from the base of trees such as those planted along highways. The tree protector includes two molded plastic halves that are fastened together around a tree to form a shallow cone. The tree protector prevents salt from leaching down to the tree roots, and protects the tree from damage from snow and slush piled around the tree. Vandal resistant fasteners retain the molded plastic halves together.

Decorative Tree Protectors

Various features have been added to tree protectors, including some decorative features such as disclosed in U.S. Pat. No. 5,794,378 issued to Beatrez. The tree protector has a circular construction made from of a single sheet of plastic. The tree protector has a central hole. A radial slot extends from the hole to an outer rim of the tree protector. An upwardly extending annular wall adjacent the outer rim forms a depressed circular trough immediately adjacent the trunk of the tree for placement of decorative bark, stones, and the like. The outer rim can be buried to anchor the tree protector into the ground.

There is a continuing need for a tree protector which has a more decorative look and which retains the mulch or other such material from being scattered onto the ground. There is a need for a tree protector that can be located on sloping and uneven ground.

SUMMARY OF THE INVENTION

1. Advantages of the Invention

One of the advantages of the present invention is that it provides a tree protector that allows trimming around the periphery of the tree protector with a lawn mower yet protects the tree from damage.

A further advantage of the present invention is its provision for a seat, which can be covered when not being used, to preserve the tree protector's aesthetic appeal.

Yet, a further advantage of the present invention is its adaptability to uneven and sloping ground using a plurality of extendible legs.

Another advantage of the present invention is its decorative appeal using lights and a metal band.

A further advantage of the present invention is the elimination of messy mulch by using a decorative cover, which includes attached mulch.

These and other advantages of the present invention may be realized by reference to the remaining portions of the specification, claims, and abstract.

2. Brief Description of the Invention

The present invention comprises a decorative tree protector that is positioned around the trunk of a tree on the surface of the ground. The tree protector shields the trunk from lawn mowers and prevents grass from growing adjacent the protector.

A first embodiment of the tree protector includes a built-in seat. This embodiment comprises a substantially rigid, generally hollow protector body having a top wall and downwardly dependent sidewall. The protector body is preferably of generally round configuration as viewed in horizontal cross-section. It could also take other shapes such as square. The top wall includes a central hole to receive and loosely fit around the trunk of a tree. A radial slit extends from the central hole through the top wall and the sidewall. Opposing portions of the protector body immediately adjacent the slit are separable by flexing the protector body to pass the trunk of the tree into the central opening.

The tree protector further comprises a retaining assembly configured to retain the opposing portions of the protector body together after the trunk of the tree is inserted into the central hole. The tree protector is substantially rigid around the trunk of the tree with sufficient strength to support a seated person. The protector body can include a plurality of radially extending reinforcement ribs. The protector body preferably includes an annular rim to permit mowing around the protector.

The first embodiment includes a recessed seat formed into the top wall and the sidewall of a sufficient size to receive the backside of a seated person. The recessed seat is covered by a movable seat cover having an open position, which selectively allows access to the seat for a person to sit, and a closed position wherein the recessed seat is covered. The seat cover is hingedly connected to the protector body, being configured to cover the recessed seat and blend in with the protector body such that the recessed seat is substantially not visible.

A second embodiment of the tree protector includes a generally hollow protector body of the same general construction as the first embodiment, but without the built-in seat and seat cover. Therefore, the protector body need not be substantially rigid since nobody should be sitting on the protector body. Rather, the protector body can even be rather flexible such that when a force is applied, the protector body flexes and then reverts to its original shape when the force is removed.

The second embodiment further comprises a decorative device for added attractiveness, such as a flower trough for planting flowers. The decorative device can comprise an electrical lighting assembly having a light source connected to a power source, such as a battery, or a solar panel. The decorative device can further comprise a decorative metallic band, which closely fits around the protector body adjacent the light source. The decorative device can include an external decoration such as bark, mulch, stones, bricks, sand, or plants, which substantially covers the protector body.

A third embodiment of the tree protector includes a generally hollow protector body of the same general construction as the second embodiment, but without the decorative device.

The third embodiment of the tree protector comprises an adjustable height device. The adjustable height device supports the protector body in a level position on uneven and sloping ground. The adjustable height device preferably includes at least three internal legs, which are generally evenly radially spaced relative to the protector body. The legs are connected to internal ribs.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of the claims. It is to be understood that the invention is not limited in its application to the details of the construction and to the arrangement of the components set forth in the following description or as illustrated in the drawings. The invention is capable of other embodiments and of being practiced and carried out in various ways. In addition, it is to be understood that the phraseology and terminology employed herein are for the purpose of description and should not be regarded as limiting.

BRIEF DESCRIPTION OF THE DRAWINGS

Preferred embodiments of the present invention are shown in the accompanying drawings wherein.

DESCRIPTION OF THE PREFERRED EMBODIMENT

Ornamental Tree Protector with Built-in Seat

Figure 1:
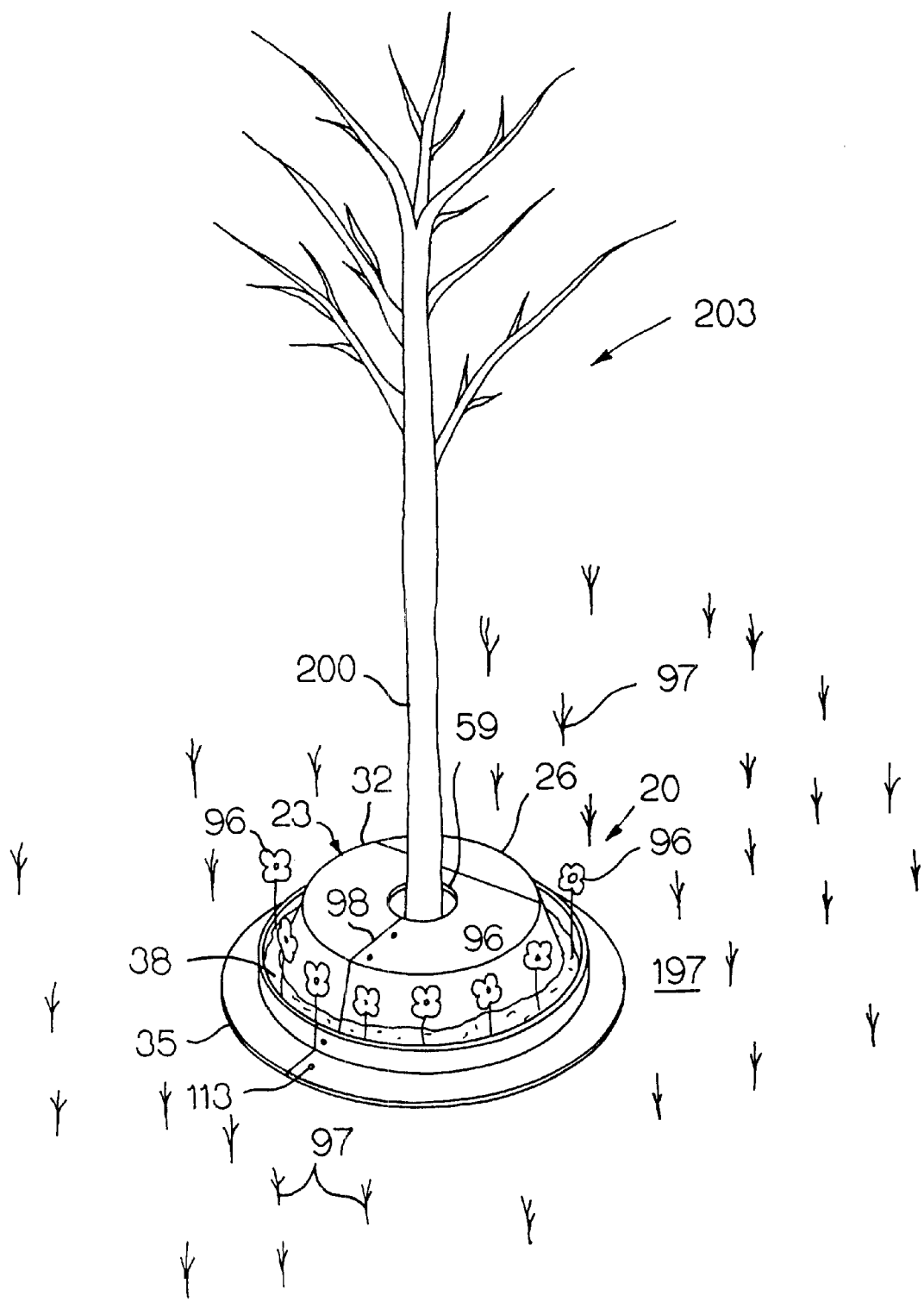
FIG. 1 is substantially a perspective view of a first embodiment ornamental tree protector according to the present invention as assembled around the trunk of a tree.

As seen in FIGS. 1–5, the present invention comprises an ornamental tree protector, a first embodiment thereof generally indicated by reference number 20. Tree protector 20 comprises a hollow protector body 23, a seat cover 26, and an adjustable height leg assembly 29.

Protector Body

Protector body 23 has a generally round hat-shape configuration, having an inner body 32, an annular rim 35, and an annular flower trough 38. Inner body 32 includes a horizontally disposed circular top wall 41 and a downwardly dependent annular sidewall 44, angled slightly off vertical, which define an inner chamber 47. A plurality of radial, internal reinforcement ribs 50, 51, 53, 54, 55, and 56 of inner body 32 stiffen protector body 23. A central hole 59 extends centrally through top wall 41 for receiving the trunk of a tree (not shown).

Figure 3:
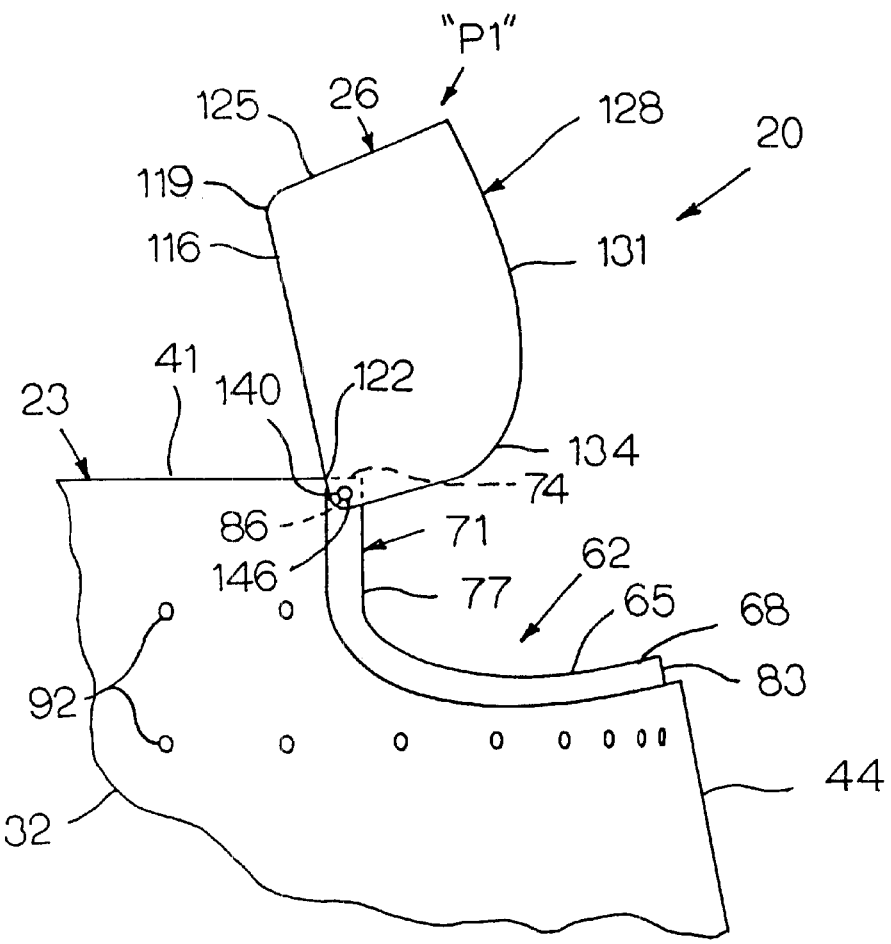
FIG. 3 is substantially a fragmentary side elevational view corresponding to FIG. 2, but with the seat cover in an open position.

Referring to FIG. 3, a seat 62 for receiving a person's backside (not shown) is formed in top wall 41 and sidewall 44 adjacent central hole 59. Seat 62 comprises a curved seat bottom 65 having a curved edge 68, a flat seat backrest 71 having a straight upper edge 74 and straight side edges 77 and 80. A right-angle depression 83 extends along curved edge 68 and side edges 77 and 80. A pair of holes 86 and 89 extend through inner body 32 at depression 83 adjacent upper edge 74.

A plurality of vent holes 92 extends through sidewall 44 to prevent excessive condensation from forming within chamber 47.

Annular rim 35 extends radially from sidewall 44 with channel-shaped flower trough 38 being integrally molded with body 32 for receiving soil and plants 96. Rim 35 prevents grass 97 and other such plants (not shown) from growing too close to inner body 32 so that a lawn mower (not shown) can pass over rim 35. This allows trimming of the grass and other plants right up to protector body 23, thus effectively eliminating hand trimming around tree protector 20.

Rim 35 can be made as a separate piece which snap fits to inner body 32 for removal if so desired. In addition, rim 35 can be removed if tree protector 20 is used on a steep slope wherein adjustable height leg assembly 29 must raise rim 35 a considerable distance off the ground to be level.

A radial slit 98 extends from central hole 59 through inner body 32, rim 35, and flower trough 38.

Figure 4:
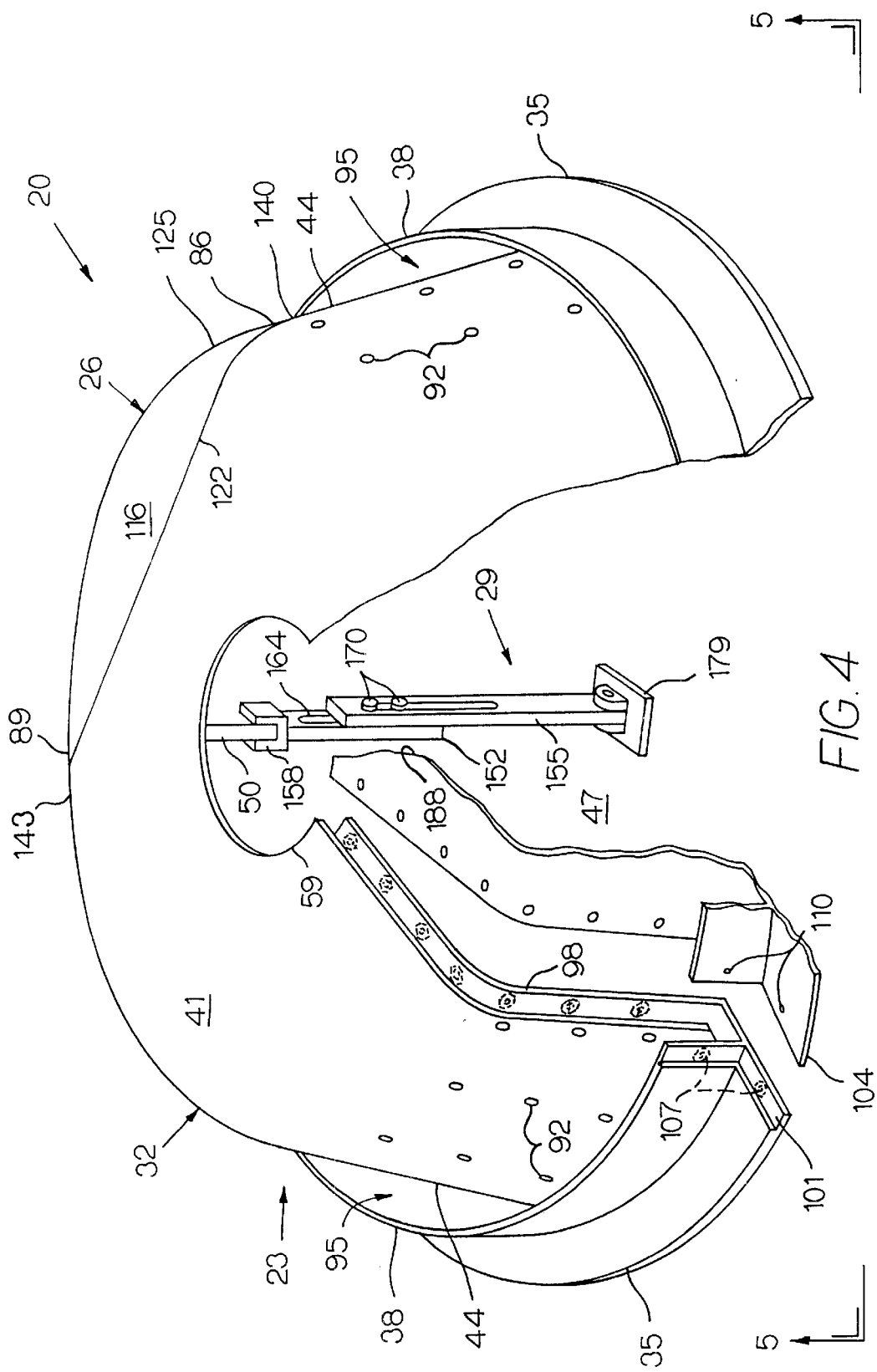
FIG. 4 is substantially a perspective view of the tree protector, being partially broken to show a typical adjustable leg and the radial slit.
Figure 5:
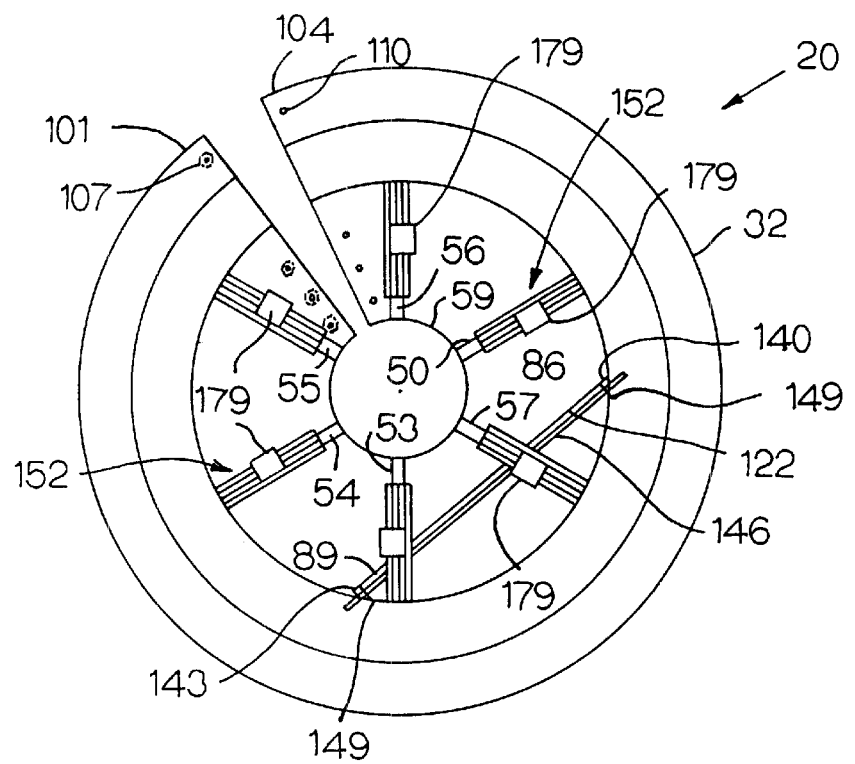
FIG. 5 is a bottom view taken on the line 5—5 of FIG. 4, showing the radial ribs and the adjustable height assembly.

Referring to FIG. 4, the areas of protector body 23 immediately adjacent slit 98 comprise respective overlapping flanges 101 and 104. A plurality of nuts 107 are molded into flange 101 and a plurality of corresponding holes 110 extend through flange 104. Screws 113 extend through holes 110 and threadably engage nuts 107 to retain flanges 101 and 104 together.

Seat Cover

Figure 2:
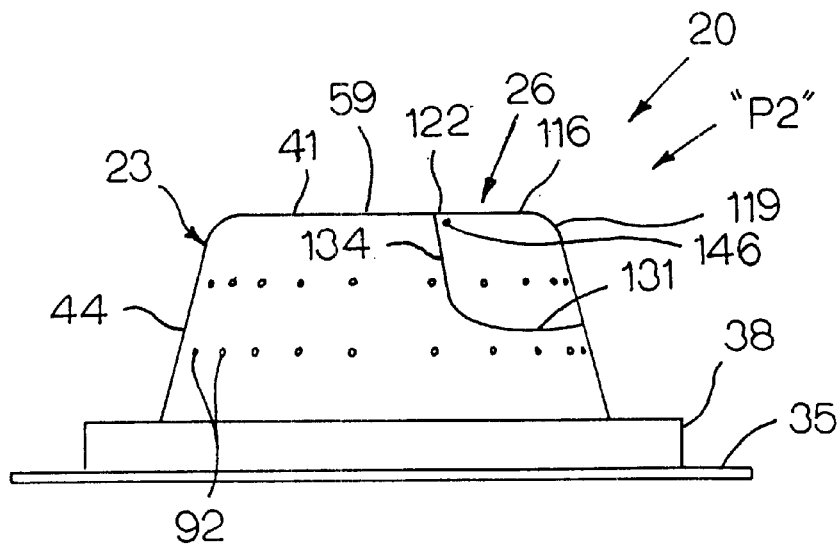
FIG. 2 is substantially a side elevational view of the tree protector with the seat cover in a closed position.

Referring to FIGS. 2 and 3, seat cover 26 is shaped to mate with depression 83 over seat 62. Seat cover 26 includes a top wall 116 having a curved edge 119 and a straight edge 122. Seat cover 26 further includes a downwardly dependent sidewall 125 angled slightly off vertical to match annular sidewall 44, forming a hollow interior chamber 128. Sidewall 125 includes a curved edge 131 and respective straight side edges 134 and 137. A pair of aligned holes 140 and 143 extend through sidewall 125 adjacent straight edge 122. A pivot pin 146 extends through holes 140 and 143 of seat 26, and through holes 86 and 89 of inner body 32 to pivotally connect seat 26 to protector body 23. A pair of star washers 149 are press fit onto pivot pin 146 to retain pivot pin 146 in position.

Seat cover 26 has an open position "P1" which uncovers seat 62 to allow a person to sit thereon, and a closed position "P2" which covers seat 62 to provide a cleaner, more aesthetically pleasing look when seat 62 is not being used.

Adjustable Height Leg Assembly

FIG. 4 shows a typical leg assembly 29. Each adjustable height leg assembly 29 comprises an upper leg 152 and a lower vertical adjustable leg 155. Each upper leg 152 has a U-shaped fork. A fork 158 receives each of ribs 50, 51, 53, 54, 55, and 56 of inner body 32. Each upper leg has a vertical adjusting slot 164. Each lower leg has a slot 167 aligned with a slot 164. A pair of fastening means 170 thread into slots 164 and 167 to clamp the two legs together. The lower leg rests on a pivotal foot 179.

Adjustable legs 155 are configured such that when positioned in a generally vertical position, each foot 179 is disposed just above annular rim 35, such that rim 35 rests on the ground to directly support protector body 23 on level ground. When the ground is not level, some or all of adjustable legs 155 can be vertically extended downwardly by loosening fasteners 170 until each foot 179 contacts the ground, and retightened to adjust for the uneven ground. This is particularly important since seat 62 should be level for maximum user comfort.

Assembly of the Tree Protector to a Tree

As best shown in FIG. 1, tree protector 20 is assembled on ground 197 around trunk 200 of a tree 203. This is accomplished by separating flanges 101 and 104 to open radial slit 98 sufficiently to pass trunk 200 into the central hole. Flanges 101 and 104 are then joined using screws 113 and nuts 107. Adjustable legs 155 are then extended as needed to compensate for the slope of the ground by loosening the appropriate fasteners 170 until each foot 179 contacts the ground. Fasteners 170 are then tightened.

Ornamental Tree Protector with Built-In Decorative Lighting

Figure 6:
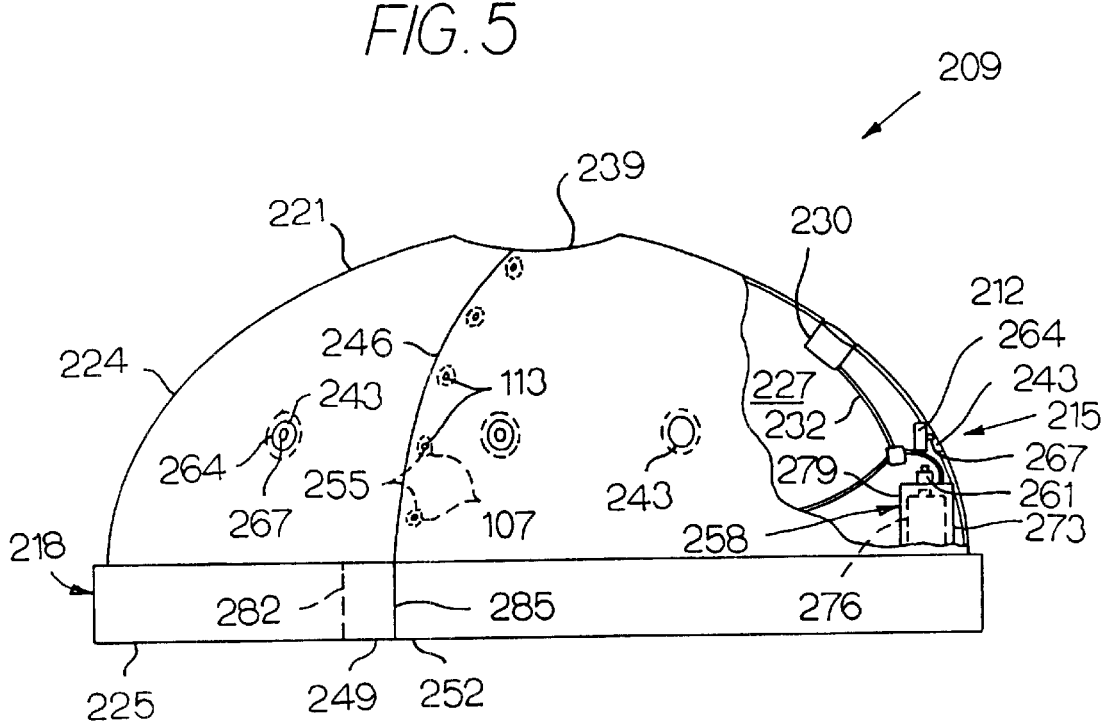
FIG. 6 is a side elevational view of a second embodiment ornamental tree protector.

As seen in FIG. 6, a second embodiment ornamental tree protector, generally indicated by reference number 209, comprises a hollow protector body 212, an electrical lighting assembly 215, a decorative metal band 218, and adjustable height leg assembly 29, not shown, identical to that supporting protector body 23.

Protector Body

Protector body 212 comprises a generally dome-shaped upper body 221, and a downwardly dependent, annular sidewall 224. Body 221 and sidewall 224 define an inner chamber 227. A plurality of radial reinforcement ribs, not shown, extend within chamber 227 to stiffen protector body 212 and to provide attachment means for the leg assembly 29. A central hole 239 in upper body 221 receives the trunk of a tree (not shown). A plurality of light bulb-receiving recessed holes 243 extends through sidewall 224.

A radial slit 246 extends from central hole 239 to the bottom edge of body 212. The areas of protector body 212 immediately adjacent radial slit 246 comprise overlapping flanges 249 and 252. A plurality of nuts 107 are molded into flange 249 and a plurality of corresponding holes 255 extend through flange 252. Screws 113 extend through holes 255 and threadably engage nuts 107 to retain flanges 249 and 252 together.

Electrical Lighting Assembly

Still referring to FIG. 6, electrical lighting assembly 215 comprises a battery case 258, a switch 261, a plurality of light bulb sockets 264, a plurality of light bulbs 267, and a wire harness 270. Battery case 258 includes a battery box 273 for housing two standard "D" size batteries 276, which are retained by a sliding lid 279. Battery box 273 includes appropriate battery contacts and wiring (not shown) to route electrical power to switch 261. Wire harness 270 connects switch 261 to light bulb sockets 264, which snapfit into recessed holes 243 through sidewall 224. Light bulbs 267 twist connect into sockets 264. When electrical lighting assembly 215 is turned on using switch 261, light bulbs 267 illuminate to provide a decorative appearance to tree protector 209. Electrical lighting assembly 215 can be modified to serially or randomly illuminate light bulbs 267.

A solar energized panel 230 is also mounted on the protector body and connected by suitable wiring 232 to the wiring for the lights to provide an alternative source of power.

Decorative Metal Band

Decorative metal band 218 is made of sheet metal, such as stainless steel or chrome plated mild steel that is bent into an annular configuration. The bend radius of metal band 218 is greater than the radius of annular sidewall 224 such that end portions 282 and 285 of band 218 overlap with metal band 218 closely fitting the sidewall. End portions 282 and 285 are retained together such as by using one or more screws and nuts (not shown).

Metal band 218 can then be raised, lowered, and tilted relative to protector body 212 to fill any gap with the ground caused by the adjustable height leg assembly compensating for uneven ground.

Ornamental Tree Protector with Outer Decorative Covering

Figure 7:
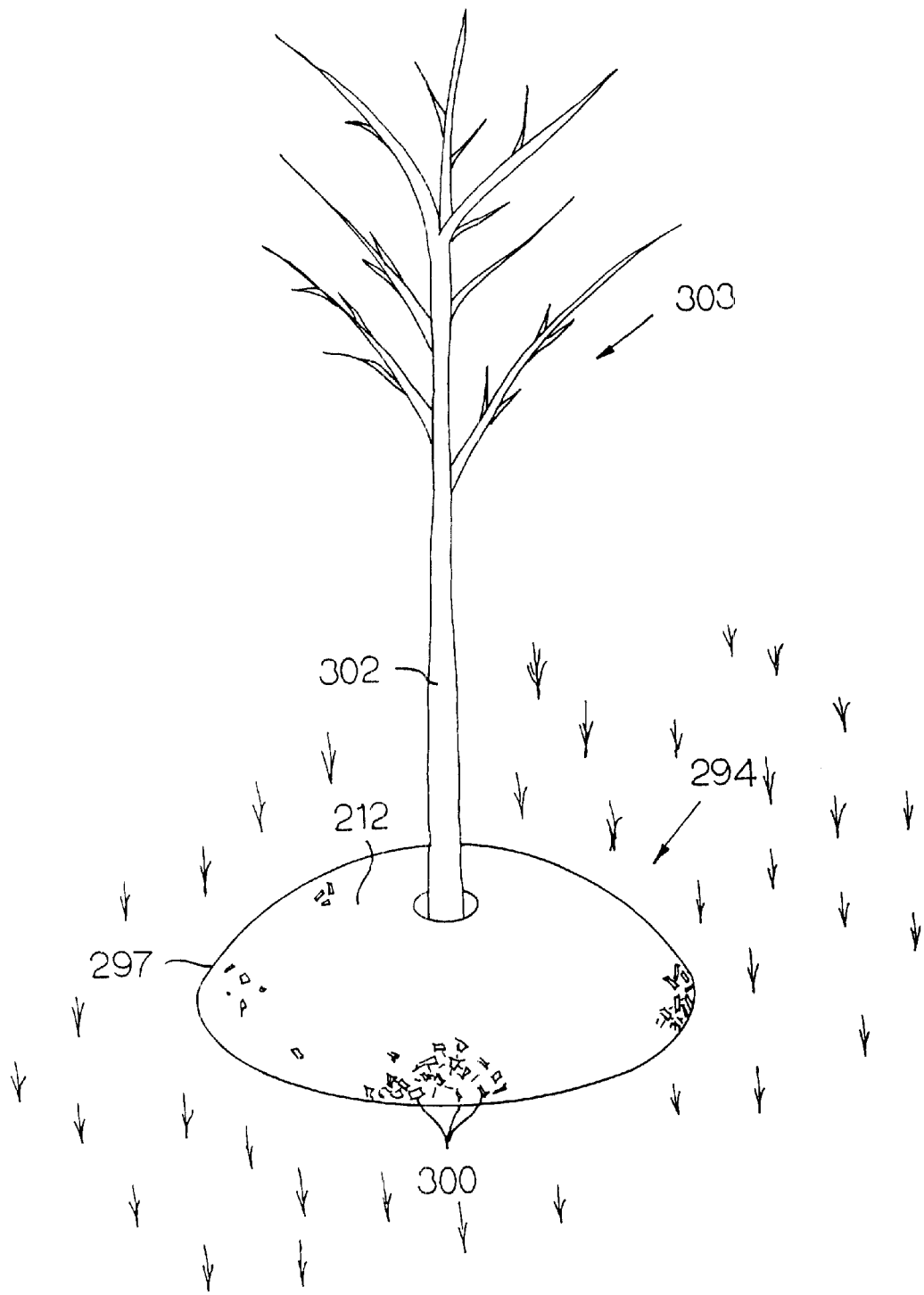
FIG. 7 is a side elevational view of a third embodiment ornamental tree protector.

As seen in FIG. 7, a third embodiment ornamental tree protector, generally indicated by reference number 294, comprises hollow protector body 212, and a decorative coating 297.

Decorative coating 297 comprises a plurality of individual decorative members, such as bark or mulch pieces 300, which are affixed to protector body 212 such as by adhesive attachment. Coating 297 is of a thickness sufficient to substantially hide protector body 212, appearing as a pile of mulch around the trunk 302 of a tree 303, but without the mess associated with real mulch.

Figure 8:
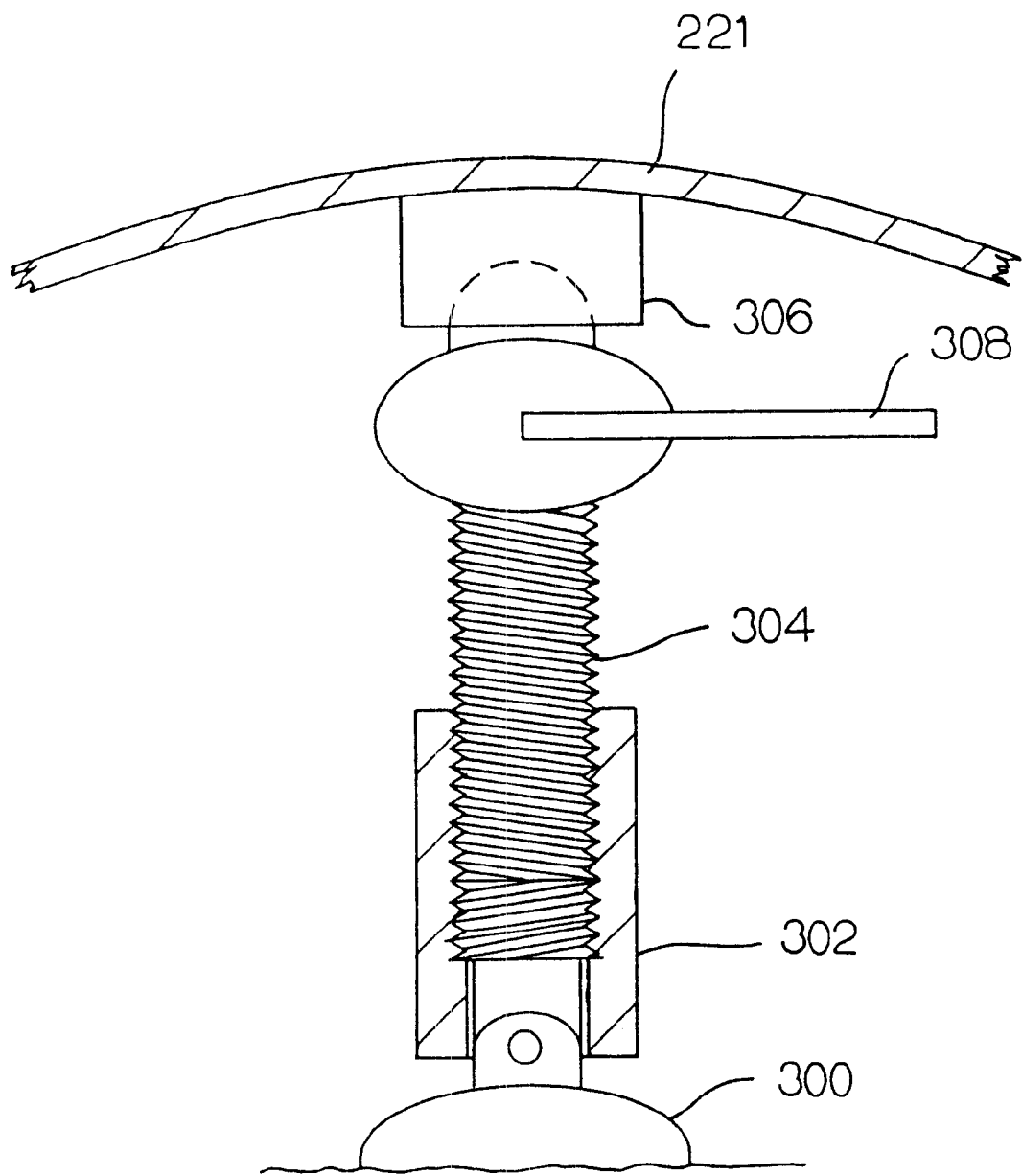
FIG. 8 shows an alternative adjustable leg.

An alternative adjustable leg is shown in FIG. 8 and comprises a base plate 300 and a pivotably mounted gear housing 302. A screw 304 has an upper end mounted in a socket plate 306. Plate 304 is attached to the inside surface of body 221. A handle 308 is mounted on the screw for turning it for raising or lowering plate 306, to accommodate the surface of the ground.

CONCLUSION

It can now be seen that the present invention solves many of the problems associated with the prior art. The present invention provides a tree protector that allows trimming around the periphery of the tree protector with a lawn mower yet protects the tree from damage. The present invention further provides a seat that can be covered when not being used to preserve its aesthetic appeal. The present invention further provides adaptability to uneven and sloping ground using a plurality of extendible legs. The present invention further provides decorative appeal using lights and a metal band. The present invention still further provides for the elimination of messy mulch by using a decorative cover, which includes attached mulch.

Although the description above contains many specifications, these should not be construed as limiting the scope of the invention but as merely providing illustrations of some of presently preferred embodiments of this invention. Thus, the scope of the invention should be determined by the appended claims and their legal equivalents rather than by the examples given.

Having described my invention, I claim:

1. A tree protector positionable around the trunk of a tree on the surface of the ground in which the tree is planted, comprising:

a substantially rigid, generally hollow protector body having a top wall and downwardly dependent sidewall, said top wall having a central hole for receiving the trunk of the tree, and a radial slit which extends from said central hole through said top wall and said sidewall to a lower edge thereof, opposing portions of said protector body immediately adjacent said slit being separable by flexing of said protector body to allow passage of the trunk of the tree from outside the tree protector into said central opening;

a retaining assembly configured to retain said opposing portions of said protector body together after the trunk of the tree is inserted within said central hole with said sidewall supported by the ground and with said central hole being closed to a sufficient extent as to prevent the tree protector from being removed from the tree, to make the tree protector substantially rigid around the trunk of the tree with sufficient strength to support a person seated thereon under the tree;

the protector body including a recessed seat formed into the top wall and the sidewall thereof for receiving the backside of a seated person;

a movable seat cover having an open position which selectively allows access to the recessed seat for a person to sit, and a closed position wherein said recessed seat is covered; and the protector body having an exterior surface that is symmetrical about the central hole, the recessed seat being disposed within said exterior surface, and the cover forming a segment of the exterior surface such that when the cover is closed, the surface of the cover blends in and forms a part of the symmetry of the exterior surface of the body.

2. The tree protector of claim 1, wherein the protector body includes a plurality of radially extending reinforcement ribs.

3. The tree protector of claim 1, wherein the protector body is generally of round configuration as viewed in horizontal cross-section.

4. The tree protector of claim 1, wherein the protector body includes an annular rim which extends radially outwardly from a lower end of the sidewall to permit mowing thereover.

* * * * *